UNITED STATES PATENT OFFICE.

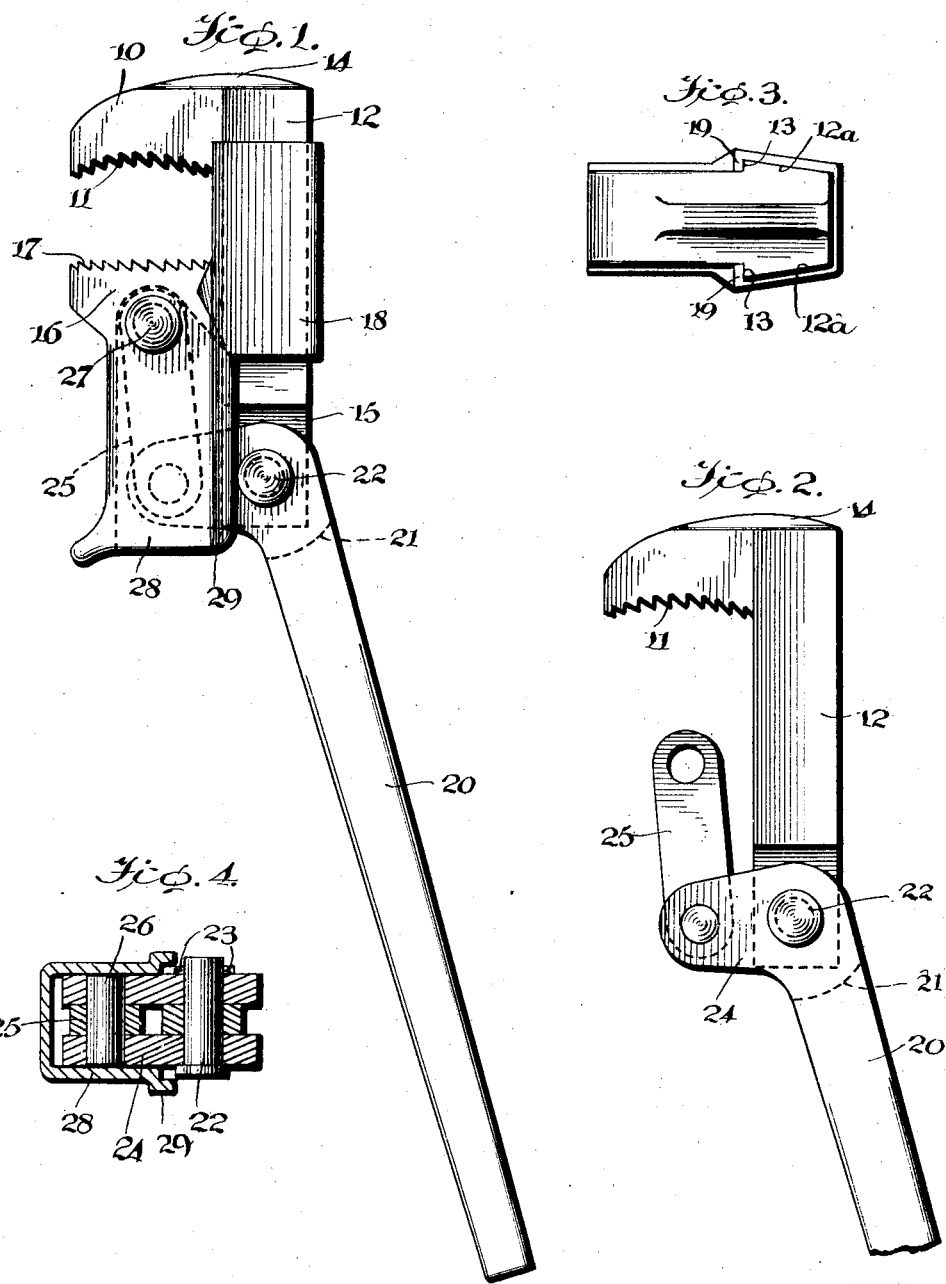

ARTHUR WELLS MINNEY, OF STOCKTON, CALIFORNIA.

WRENCH.

1,391,337. Specification of Letters Patent. Patented Sept. 20, 1921.

Application filed March 3, 1921. Serial No. 449,296.

*To all whom it may concern:*

Be it known that I, ARTHUR W. MINNEY, a citizen of the United States, and resident of Stockton, in the county of San Joaquin and State of California, have invented certain new and useful Improvements in Wrenches, of which the following is a specification.

My invention relates to improvements in wrenches and has for its object to provide an improved wrench which is of simple and durable construction, reliable in operation and easy and inexpensive to manufacture, which exerts a proper gripping action upon the work and which immediately responds to the control of the operator during the engaging, gripping and disengaging phases of its operation.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is an elevational view of the invention;

Fig. 2 is a detail view in side elevation of the outer jaw, handle and link;

Fig. 3 is a top plan view; and

Fig. 4 is a transverse sectional view on line 4—4 of Fig. 1.

Referring to the drawings wherein for the sake of illustration is shown the preferred embodiment of the invention the numeral 10 designates the outer jaw of the wrench, the jaw face of which is concave, as shown in the drawings, and is provided with downwardly and inwardly inclined teeth or serrations 11. A shank 12 is integrally formed with the outer jaw 10, and has its opposite side faces 12$^a$ inclined, as clearly shown in Fig. 3. Adjacent the wrench the shank is of slightly greater width and presents shoulders 13 along the line of juncture of the shank and the jaw. At the top of the shank and jaw a reinforcing web is provided. The outer end of the shank 12 is reduced, as at 15, for a purpose to be hereinafter more fully described.

An inner jaw 16 coacts with the outer jaw 10, and its jaw face is provided with upwardly and outwardly inclined teeth which lie substantially in the same plane. A guide 18 is integrally formed or otherwise secured to the inner jaw 16 and embraces and conforms to the shank 12 of the outer jaw. The guide is provided with angular flanges 19 which engage with the shoulders 13 of the shank 12, as shown at 23.

A handle 20 has its upper end bifurcated, as at 21. This bifurcated end embraces the reduced extension 15 of the shank 12 and is pivotally connected therewith by means of the headed pivot bolt 22 which extends through alined pivot openings provided in the bifurcated handle 20 and in the reduced extension 15 and which is secured in position by means of a cotter pin or the like 23. Extending angularly with respect to the bifurcated end of the handle 20 and integrally formed therewith is a pair of spaced lateral arms 24. A link 25 has one of its ends received between the arms of the pair 24 and pivotally connected thereto by means of a pivot pin 26. The other end of the link is pivotally connected to the inner jaw 16 by means of a headed pivot pin 27. A depending casing or guard 28 is integrally formed with the inner jaw 16 and incases the link 25 and the lateral arms of the handle 20 and has offset flanges 29 extending over the shank 12 for a short distance.

In practice, the operator grasps the handle 20 and applies the jaws of the wrench to the work or object. The concaved outer jaw and its inwardly inclined teeth and the plane inner jaw and its outwardly inclined teeth coact to efficiently grip the object and retain it in the field of action of the jaws. When force is applied to the handle 20 to impart the requisite movement to the work it draws the jaws together simultaneously with the turning action. The jaws are constrained to rectilinear movement toward and away from each other, the other rectilinear component of the rotary motion of the handle being taken up by the link 25. It is to be understood, however, that by virtue of the arrangement of pivots the component of the rotary motion of the handle which does not produce rectilinear motion of the jaws toward and away from each other is relatively small and swings the link 25 through a very small arc. The link 25 may thus be incased and its pivotal motion is protected. In this connection it is obvious that the casing 28 serves also to secure the pivot pin 26 against lateral displacement when the wrench is assembled.

I claim:

1. A wrench of the character described comprising an outer jaw having a shank provided with inclined side faces comprising shoulders on the line of juncture of the shank with the jaw, an inner jaw having a guide embracing said shank and provided with angular flanges slidably engaged with the shoulders of the shank, said shank having a reduced extension at its outer end, a handle having a bifurcated end embracing said reduced extension, a pivot pin extending through said bifurcated end and said reduced extension, said bifurcated end being provided with a pair of lateral arms, a link having one end received between said lateral arms, pivot pins extending through said link and said lateral arms and a pivot pin connecting the other end of said link to said inner jaw, said inner jaw having a depending guard incasing said link and said lateral arm and preventing lateral displacement of the pivot pin connecting the links and the lateral arms.

2. A wrench of the character described comprising an outer jaw having a shank provided with inclined side faces comprising shoulders on the line of juncture of the shank with the jaw, an inner jaw having a guide embracing said shank and provided with angular flanges slidably engaged with the shoulders of the shank, said shank having a reduced extension at its outer end, a handle having a bifurcated end embracing said reduced extension, a pivot pin extending through said bifurcated end and said reduced extension, said bifurcated end being provided with a pair of lateral arms, a link having one end received between said lateral arms, pivot pins extending through said link and said lateral arms, and a pivot pin connecting the other end of said link to said inner jaw.

ARTHUR WELLS MINNEY.